United States Patent [19]
Andreica et al.

[11] Patent Number: 5,905,624
[45] Date of Patent: May 18, 1999

[54] ELECTROMAGNET CONTROL SYSTEM HAVING PRINTED CIRCUIT BOARD VARIABLE VOLTAGE SELECTION ARRAY

[75] Inventors: Marius Andreica; Vasile Andreica, both of Portland, Oreg.

[73] Assignee: Northwest Magnet, Inc., Portland, Oreg.

[21] Appl. No.: 09/087,131

[22] Filed: May 29, 1998

[51] Int. Cl.$^6$ .................................................. H01H 47/00
[52] U.S. Cl. .......................................... 361/144; 361/152
[58] Field of Search .................................... 361/170, 143, 361/152, 154, 144; 363/255, 340; 322/28, 19, 37; 318/126

[56] References Cited

U.S. PATENT DOCUMENTS

| | | | |
|---|---|---|---|
| 2,257,361 | 9/1941 | Yorkey | 361/144 |
| 3,206,652 | 9/1965 | Monroe | 361/144 |
| 3,774,050 | 11/1973 | Littwin | 307/66 |
| 4,419,618 | 12/1983 | Gretsch | 322/7 |
| 5,561,330 | 10/1996 | Crook | 290/30 R |
| 5,672,954 | 9/1997 | Watanabe | 322/28 |
| 5,813,712 | 9/1998 | Mozelt | 294/65.5 |

OTHER PUBLICATIONS

International Electrical SyStems, Inc., product flier for "SofTouch Lifting Magnet Controller," 1 page (prior to 1998).
International Electrical Systems, Inc., product brochure for "SofTouch Magnet Lifting Controller," 9 pages (prior to 1998).
International Electrical Systems, Inc. manual, "SofTouch Installation and Service 5–240AC," 31 pages (1996).

*Primary Examiner*—Jeffrey Gaffin
*Assistant Examiner*—Kim Huynh
*Attorney, Agent, or Firm*—Klarquist Sparkman Campbell Leigh & Whinston, LLP

[57] ABSTRACT

A magnet generator controller has a variable voltage array fabricated as a formation of receptacles mounted on a printed circuit board and interconnected via traces to pairs of taps off a transformer winding, and a plug-in connector that inserts in a selected receptacle to electrically couple one of various pairs of the taps to a field winding output in a mode of operation of the controller. This sets the voltage of the field winding output in the mode. The magnet generator controller also has a function select switch that allows selection of a run function in which the magnet generator controller sequences through plural modes (e.g., extra lift, lift, and drop modes) with associated field winding output settings in response to an operator control switch and timers. For use during set-up or fine-tuning, the function select switch also allows selection of exclusive mode functions in which the magnet generator controller operates indefinitely in an exclusive one of the modes.

13 Claims, 5 Drawing Sheets

ELECTROMAGNET CONTROL SYSTEM HAVING PRINTED CIRCUIT BOARD VARIABLE VOLTAGE SELECTION ARRAY

FIELD OF THE INVENTION

The present invention relates to a system for controlling power delivered by a generator to an electromagnet, and more particularly relates to a circuit structure for variable voltage selection and the use of a DC battery power source and an AC power inverter in such a control system.

BACKGROUND AND SUMMARY OF THE INVENTION

Electromagnets are commonly used in industry to lift and move heavy metal objects, such as scrap metal. In general, an electromagnet consists of a wire coil (the "magnet winding") wound around an iron core. A magnetic field is generated in the electromagnet when electric current flows through the magnet winding. Typically, electrical power is supplied to the electromagnet from a DC generator.

Prior control systems for electromagnets have primarily used two different approaches to controlling the electromagnet. According to a first approach, switches having high current contactors are connected between the DC generator and the electromagnet to allow an operator to selectively open and close the circuit between the DC generator and electromagnet to power the electromagnet on or off. This approach has a number of problems, including that the arrangement is prone to voltage surges and current arcing which cause damage to the magnet winding, switch contactors and insulation.

A second approach to controlling the electromagnet is to controllably vary the excitation voltage applied to the field winding of the DC generator. With this second approach, the DC generator and electromagnet can remain connected at all times. Power to the electromagnet is instead interrupted by simply removing the excitation voltage from the generator field winding. Also, the direction of the electromagnet's magnetic field can be reversed by reversing the polarity of the voltage applied to the generator field winding. This approach has the advantage that a much lower current is applied to the generator field winding as compared to the electromagnet, so that switching power on and off to the generator field winding is less likely to cause surges and arcing that damages switches, insulation and wiring and also less costly control circuit components can be used. Further, the electromagnet's power can be discharged back to the DC generator's armature winding when switched off, completely eliminating high voltage surges otherwise experienced when the magnet generator circuit is opened and the magnetic field collapses.

One example of a prior art control system using the second approach is described in Yorkey, U.S. Pat. No. 2,257,361.

Another example of a prior art control system using the second approach is the SofTouch® Lifting Magnet Controller marketed by International Electrical Systems, Inc. of Lumberton, Tex.

Although providing the advantages from use of the second approach, the SofTouch® Lifting Magnet Controller and like prior art control systems still have several disadvantages. These disadvantages include the use of variable resistors to set the voltages applied to the generator field winding during the lift and drop cycles of the electromagnet operation cycle. Suitable variable resistors for producing the required voltages for the generator field winding are heavy and bulky. Further, the variable resistors used in the control system often have to be swapped according to the rating of the particular DC generator and electromagnet for use in a particular installation. Also, an additional AC generator must be ordered according to the size of the system and physically installed in the crane in order to provide the AC power required to excite the primary DC generator.

Additionally, prior art magnet control systems have been rigidly mounted in order to adequately support heavy, high current electrical components used in the control systems, such as variable resistors and high current switch contactors. However, the control systems typically are installed in environments subject to large amount of vibration (e.g., from a diesel engine or other motor that drives the DC generator). This can cause relay switches used in the control systems to unexpectedly trip.

Further, prior art magnet control systems historically have operated at very high voltages and currents requiring suitable insulation of their wiring paths, and could not therefore be manufactured on a printed circuit board.

The present invention overcomes these and other disadvantages of prior art magnet generator controllers. A magnet generator control system in an embodiment of the invention illustrated herein (the "illustrated magnet controller") overcomes the disadvantages of variable resistors used in the SofTouch® Lifting Magnet Controller and like control systems by providing a plug-in connector-selectable variable voltage array for selection of the voltages applied to the generator field winding. This variable voltage array includes an array of connector receptacles. Each of the connector receptacles have conductor terminals that are connected to different sets of transformer taps, such that successive connector receptacles provide discrete voltages in increasing order along the array. A plug-in connector on a cable can be placed in a desired one of the connector receptacles to select the connector receptacle's respective discrete voltage. The illustrated magnet controller provides separate variable voltage arrays for selecting each of an extra lift voltage, a lift voltage and a drop voltage. The variable voltage arrays can be readily implemented on a printed circuit board, which in the illustrated magnet controller is supported on rubber mounts for vibration isolation.

The illustrated magnet controller also provides a plug-in connector-selectable master function switch that allows selection of normal run cycle operation, or exclusive-selection of one of the modes of the normal run cycle. In the normal run cycle operation, the illustrated magnet controller sequences through the modes in set time intervals. Alternatively, exclusive operation in a single mode can be selected to more easily and safely set the voltage applied to the generator field winding in that mode.

The illustrated magnet controller further uses an AC power inverter powered by a DC battery to supply the AC excitation voltage for the generator field winding suitable for various size electromagnet systems. This eliminates the need for an additional AC generator sized specifically to the electromagnet system in which the controller is installed.

Additional features and advantages of the invention will be made apparent from the following detailed description of an illustrated embodiment which proceeds with reference to the accompanying drawings.

DETAILED DESCRIPTION OF THE ILLUSTRATED EMBODIMENTS

Figure 1:
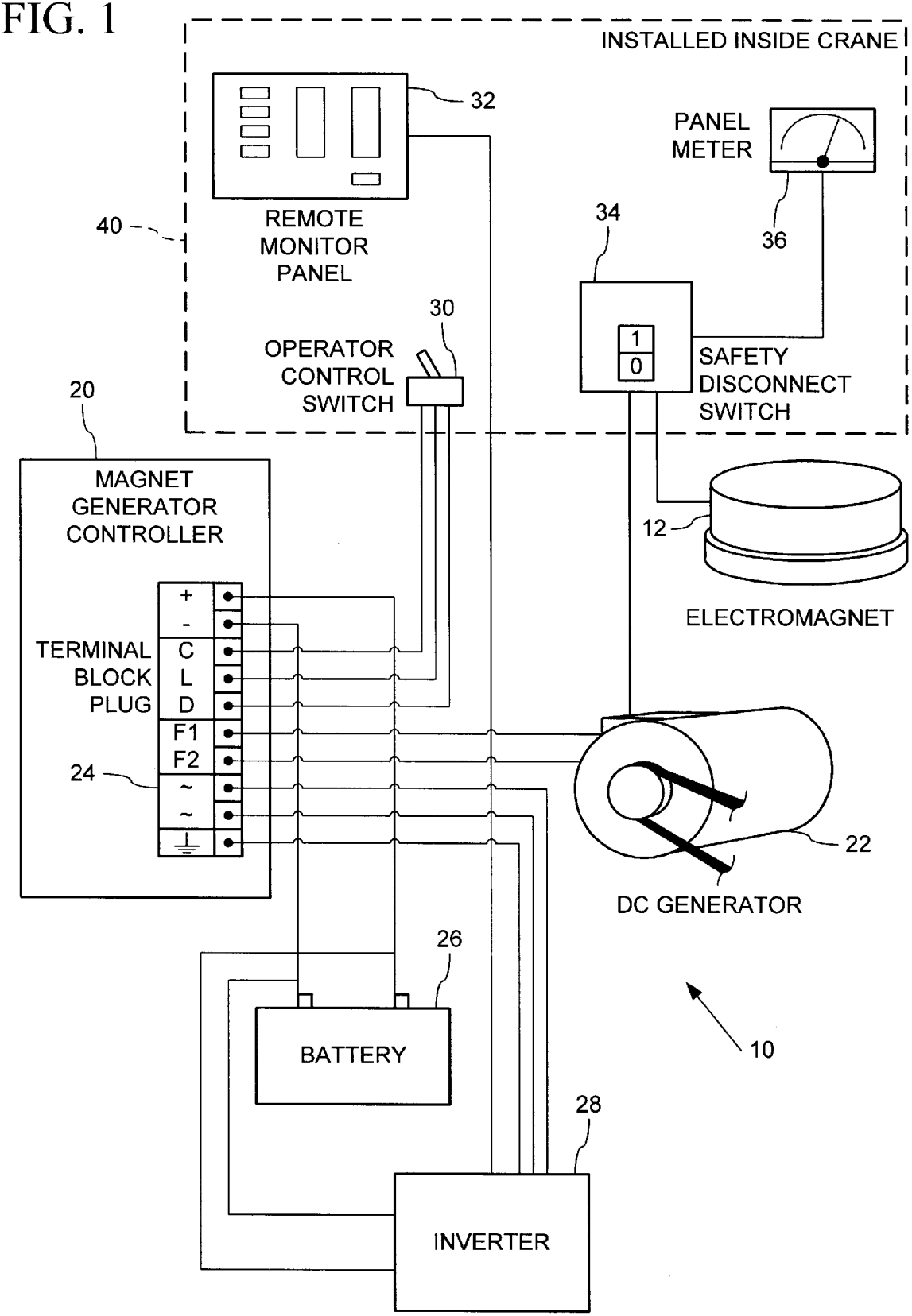
FIG. 1 is a block diagram of a system employing a DC generator powered electromagnet and associated equipment that is controlled by the illustrated magnet controller according to the invention.

The present invention is directed toward a more effective and efficient control system 10 for an electromagnet 12 that may be used on a crane or like lifting application as shown in FIG. 1. In one embodiment illustrated herein, the invention is incorporated into a magnet generator controller 20 in the system 10. The magnet generator controller 20 controls the power of the electromagnet 12 by varying the voltage of the field winding in a DC generator 22. The illustrated magnet generator controller 20 is designed using widely available modular components supported on a printed circuit board, which has advantages of easy set-up and low maintenance.

In the illustrated system 10, the magnet generator controller 20 has a terminal block plug 24 which provides electrical connections to other equipment in the system. The illustrated magnet generator controller 20 is powered by a battery 26 (or like DC power source) and a power inverter 28. The battery provides 24 Volt DC power for electrical control circuitry in the magnet generator controller 20, while the power inverter 28 provides higher voltage AC power used to create the voltages applied to the field winding of the DC generator 22. The terminal block plug provides connections to the positive and negative terminals (+, −) of the battery 26, as well as to the AC power outputs (~ and ground) of the power inverter 28. The terminal block plug also provides outputs (F1, F2) for connection to the field winding of the DC generator 22.

The control system 10 is operated with an operator control switch 30, a remote panel monitor 32, a safety disconnect switch 34, and a panel meter 36, which may be located for convenience in a operator's cab 40 of the crane. The operator control switch 30 can be a three position toggle switch (with lift, off and drop positions) as shown, or two push-button switches. The operator control switch 30 connects to the terminal block plug 24 of the magnet generator controller 20.

The remote monitor panel 32 connects to the power inverter 28, and provides a set of LEDs to indicate the operational status of the power inverter 28. The remote monitor panel 32 also has a power on/off switch, which operates to switch on and off the power to the system 10 as a whole (including the magnet generator controller 20, the DC generator 22, the electromagnet 12 and the power inverter 28). The panel meter 36, on the other hand, connects to the safety disconnect switch 34 in the circuit between the DC generator 22 and electromagnet 12, and provides an indication of the voltage being applied to the electromagnet 12. The safety disconnect switch 34 allows interruption of the circuit between the DC generator 22 and the electromagnet 12, such as in an emergency or as a precaution during servicing and set-up. The circuit from the DC generator's DC power output to the electromagnet 12 remains closed during normal operation.

Figure 2:
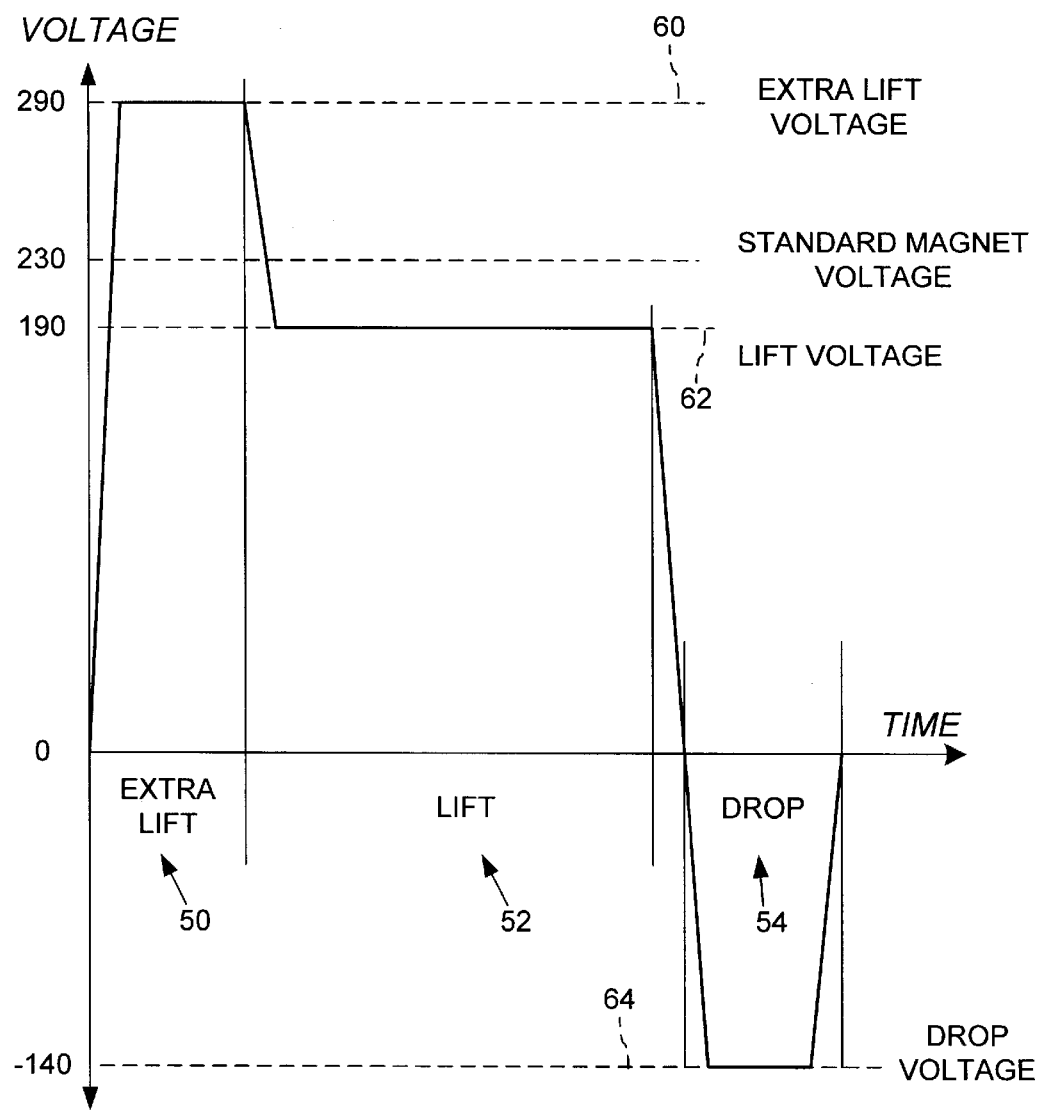
FIG. 2 is a graph of the DC generator voltage output to the electromagnet under control of the magnet generator controller in the control system of FIG. 1 during normal "run" operation.

With reference to FIG. 2, the illustrated magnet generator controller 20 (FIG. 1) controls the DC generator voltage that is applied to electromagnet 12 through three modes of operation (an extra lift mode 50, a lift mode 52, and a drop mode 54) in a normal run cycle. The run cycle is initiated when the operator moves the operator control switch 30 (FIG. 1) to the lift position. In response, the magnet generator controller 20 first enters the extra lift mode 50. In this mode, the magnet generator controller 20 creates and applies an appropriate voltage to the field winding of the DC generator 22 to cause the DC generator to produce a selected "extra lift" voltage 60 for a short, set time interval (e.g., 0–6 seconds). The extra lift voltage 60 may be selected to be higher than the normal operating voltage of the magnet, e.g., 250–300 Volts for an electromagnet having a standard voltage of 230 Volts. This high initial voltage enables the electromagnet to lift and hold more material (e.g., up to 30% more weight).

After the extra lift time expires, the magnet generator controller 20 enters the lift mode 52. In this mode, the magnet generator controller creates and applies an appropriate voltage to the field winding of the DC generator to cause the DC generator to produce a selected lift voltage 62. The lift voltage 62 may be selected to be somewhat lower than the standard operating voltage of the electromagnet, e.g., 190–230 Volts for an electromagnet having a standard voltage of 230 Volts. This allows the electromagnet to operate more efficiently at a cooler temperature, while continuing to hold all or most all of the material initially magnetized and lifted during the extra lift mode.

The magnet generator controller 20 continues in the lift mode 52 until the operator returns the operator control switch 30 (FIG. 1) to the off position, whereupon the magnet generator controller automatically goes to an auto-drop mode 54. In this mode, the magnet generator controller 20 creates and applies an appropriate voltage of a reverse polarity to the field winding of the DC generator to cause the DC generator to produce a selected "drop voltage" for a short, set time interval. The drop voltage and time interval preferably are set to cause the material lifted during the extra lift and lift modes to drop from the electromagnet, on a consistent basis (e.g., 100 to 250 Volts and about 1.25 seconds).

The magnet generator controller 20 also has a manual drop mode in which the magnet generator controller 20 again applies the appropriate reverse polarity voltage to the generator field winding to cause the DC generator to produce the selected drop voltage (i.e., similar to the auto-drop mode 54, but without the set time interval). The mode begins when the operator moves the operator control switch 30 to the drop position and ends when the switch is returned to the off position. The manual drop mode can be used to sort material by size and weight.

Figure 3:
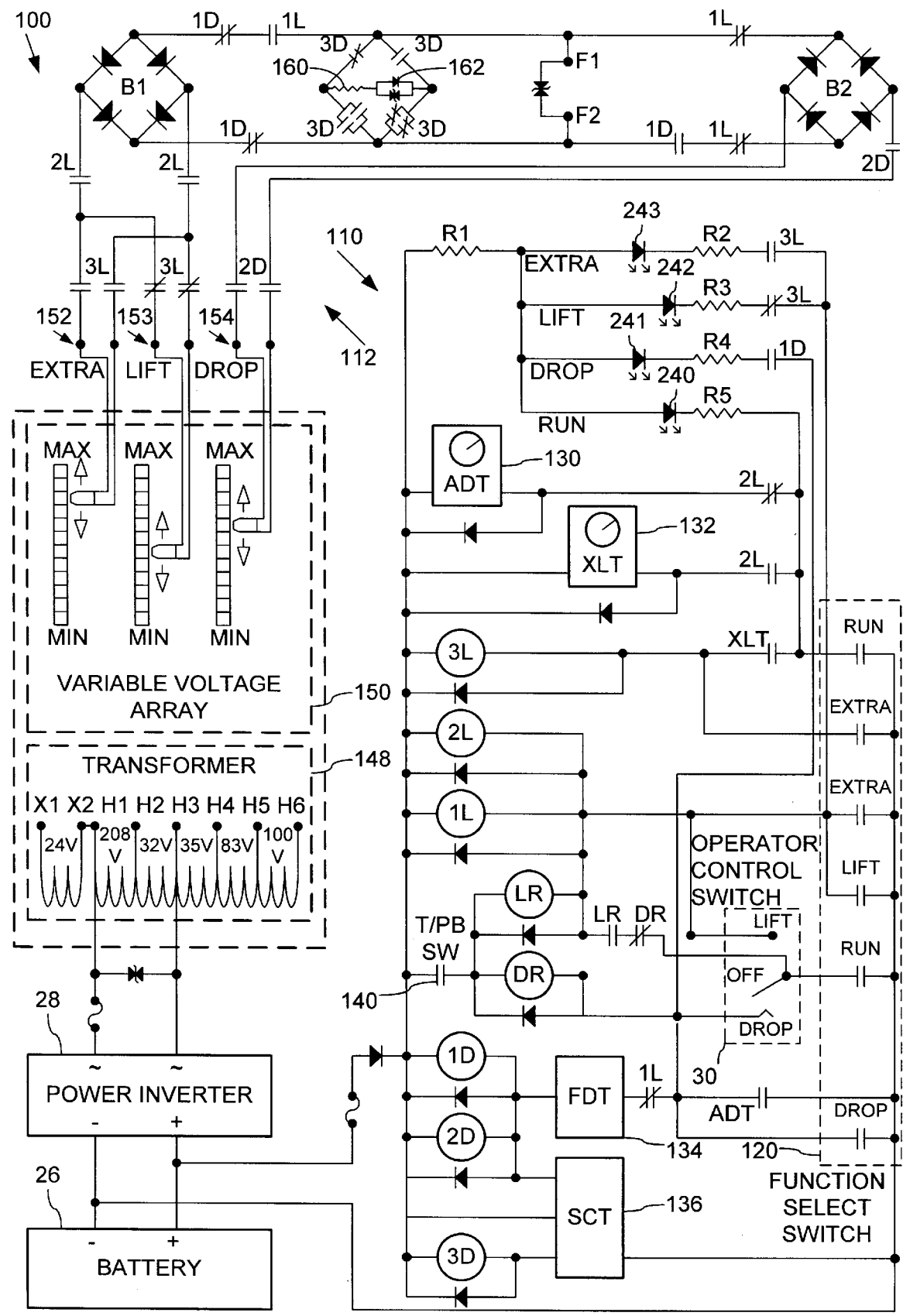
FIG. 3 is a schematic block diagram of an electrical circuit of the illustrated magnet controller.

With reference now to FIG. 3, the illustrated magnet generator controller 20 (FIG. 1) has electrical circuitry 100 for producing the voltages at terminals F1 and F2 that are applied to the generator field winding to create the selected magnet voltages 60, 62, 64 (FIG. 2) according to the operating modes 50, 52 and 54 (FIG. 2). In general, the circuitry 100 comprises an arrangement of relays (1D, 2D, 3D, 1L, 2L, 3L, LR, and DR) and delay timers (ADT, XLT, FDT, and SCT) in a control portion 110 that actuate like denoted contactors in a field voltage generation portion 112

(and also some in the control portion 110) of the circuitry 100. The relays and timers are activated in the control portion 110 in response to the position of the operator control switch 30 and a function select switch 120.

The delay timers include an auto-drop timer 130 (ADT) and an extra lift timer 132 (XLT) which can be manually set to control the duration of the extra lift mode 50 (FIG. 2) and the auto-drop mode 54 (FIG. 2), respectively. A field discharge timer 134 (FDT) times a short delay interval (about 0.5 seconds) between the lift mode 52 and auto-drop mode 54 to allow the energy created in the field winding during the lift mode 52 (FIG. 2) to be discharged. A surge control timer 136 (SCT) times a relay (3D) to also discharge the energy in the field winding at the end of the drop mode 54 (FIG. 2).

A control select switch 140, which is set by placing a jumper (open for toggle or closed for push-button), configures the circuitry to allow use of either a 3-position toggle switch or two push-button switches as the operator control switch 30.

In the field voltage generation portion 120, the AC power supplied by the power inverter 28 is stepped-up in a transformer 148 to produce a variety of voltages available at a set of taps (X1, X2, H1, H2, H3, H4, H5, and H6) off the transformer's winding. A variable voltage array 150 (described below) allows selection from among permutations of pairs of the taps (and consequently selection of the AC voltage between the selected pairs) to establish the AC voltage at each of extra lift terminals 152, lift terminals 153, and drop terminals 154. The AC voltages at these terminals 152–154 are fed through two bridge rectifiers (B1 and B2) according to the open and close states of the relay controlled contactors (1D, 2D, 1L, 2L, and 3L) during the extra lift mode 50, lift mode 52 and drop mode 54 to create the extra lift voltage 60, lift voltage 62, and drop voltage 64, respectively, at the field generator winding terminals (F1 and F2). The bridge rectifiers (B1 and B2) rectify the AC voltages to DC voltages having the appropriate polarity for lift or drop operation. A resistor 160 and a diode 162 form a field discharge circuit that acts to discharge the energy from the field winding at the end of the lift mode 52 (FIG. 2) and drop mode 54 (FIG. 2).

Figure 4:
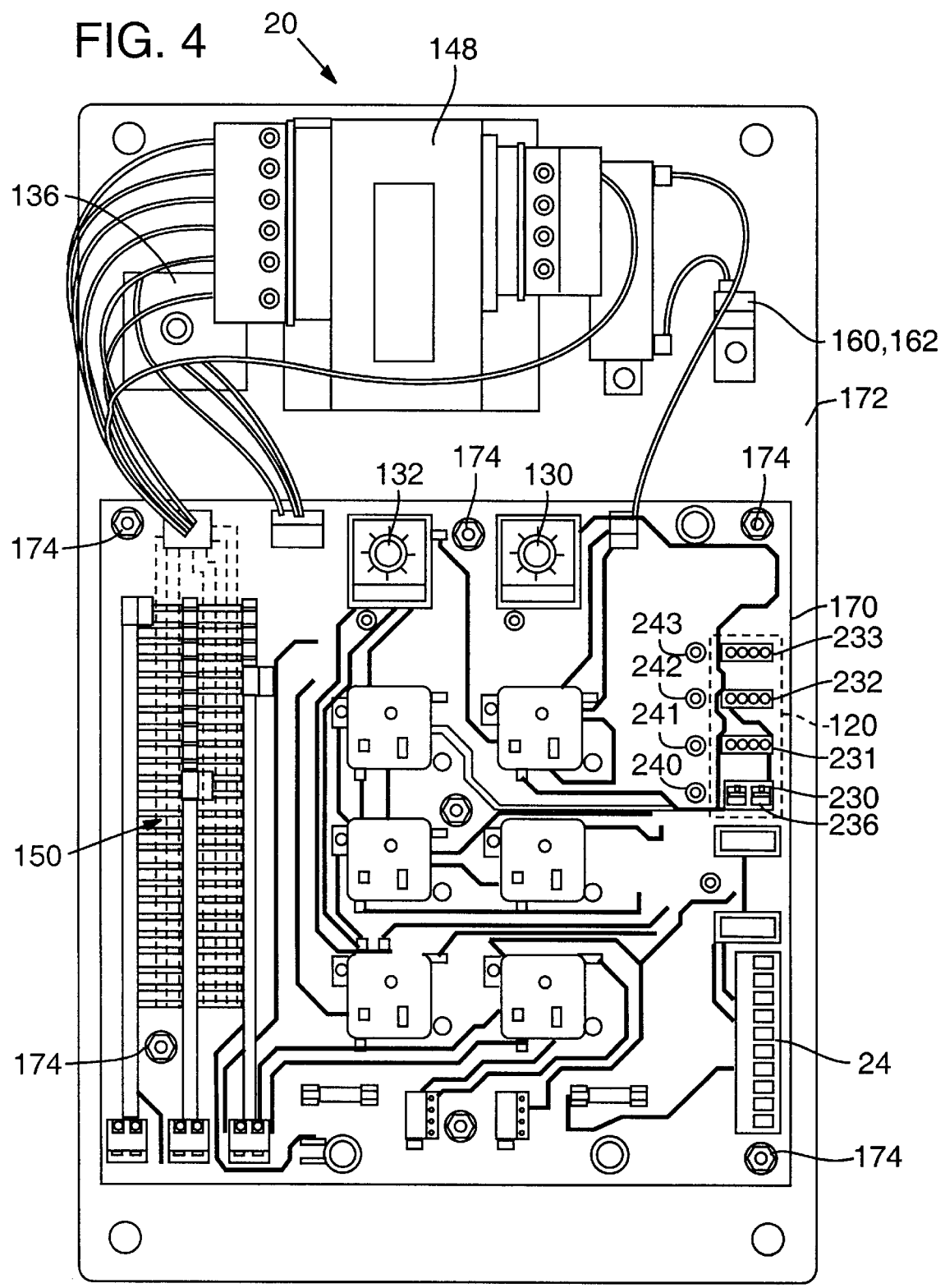
FIG. 4 is a front view of the illustrated magnet generator controller having a rubber mounted printed circuit board.

With reference to FIG. 4, the electrical circuitry 100 of the illustrated magnet generator controller 20 is fabricated primarily as an assembly of standard, widely-available modular electrical components (i.e., the relays, bridge rectifiers, relay timers, fuses, LEDs, and connectors) that plug into corresponding receptacles mounted on a printed circuit board 170. The printed circuit board 170, in turn, carries metal traces that interconnect the components in the circuit arrangement shown schematically in FIG. 3. The printed circuit board 170 is mounted on a panel 172 using vibration-insulating rubber mounting grommets and bolts 174. The transformer 148, the surge control timer 136, and field discharge circuit 160, 162 are separately mounted to the panel 172.

Figure 5:
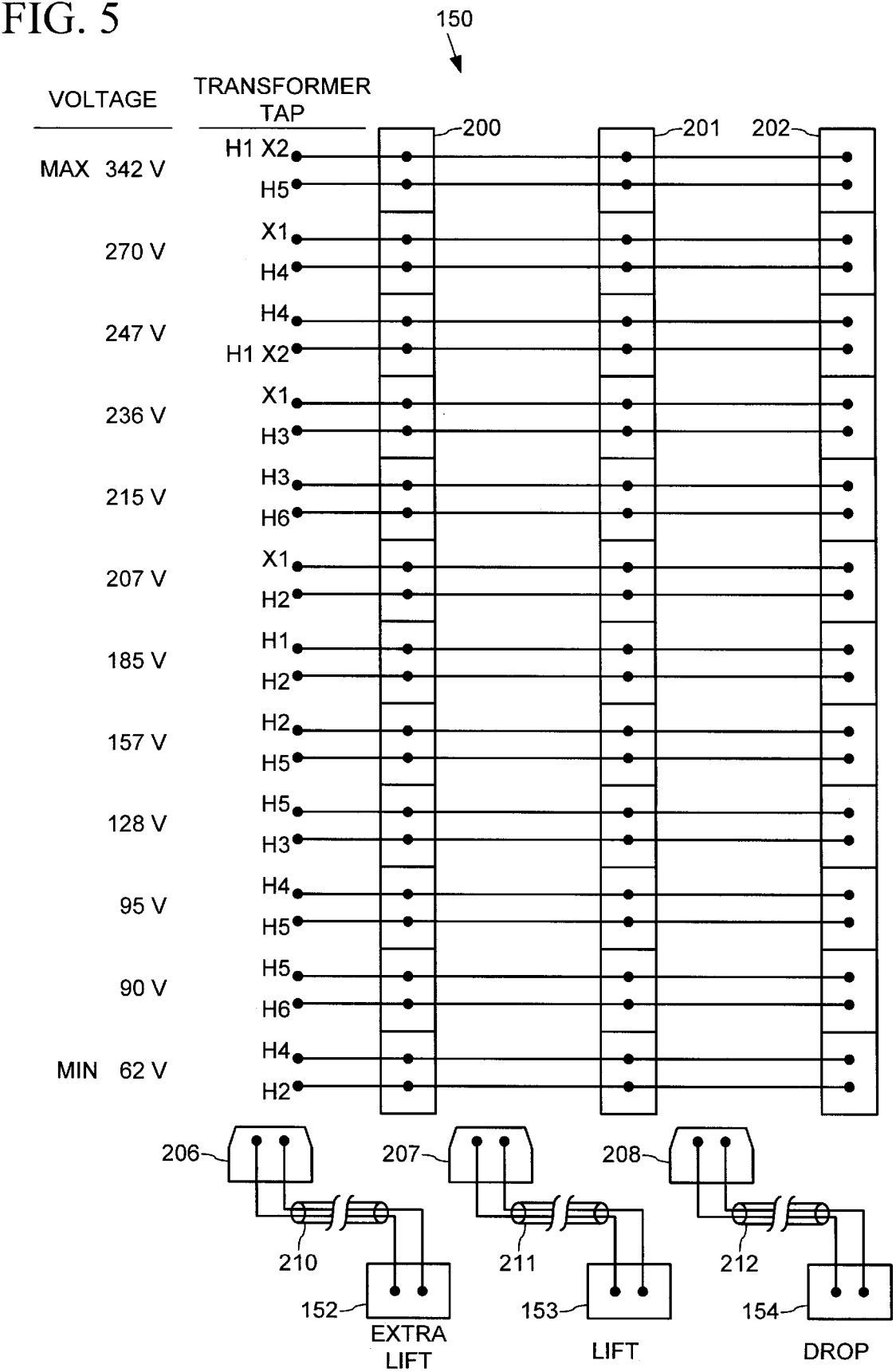
FIG. 5 is a diagram of interconnections of a variable voltage selection array to taps of a transformer in the illustrated magnet controller's electrical circuit of FIG. 3.

With reference now to FIG. 5, a fundamental feature that enables fabrication of the illustrated magnet generator controller 20 (FIG. 1) on a printed circuit board is the variable voltage array 150. The illustrated variable voltage array 150 is constructed as three linear formations of receptacles (receptacle arrays 200–202) mounted on the printed circuit board 170. The receptacles each contain two terminals which are connected via metal traces imprinted on the printed circuit board 170 to different pairs of taps on the transformer 148, which are configured such that the voltage available at the receptacle terminals increases progressively from a minimum voltage at one end of each array to a maximum voltage at the other.

A plug-in connector 206–208 attached on a flexible, two-conductor cable 210–212 connects to each of the extra lift, lift and drop terminals 152–154. Each of the extra lift, lift and drop terminals 152–154 are positioned on the printed circuit board 170 near a respective one of the receptacle arrays 200–202 (e.g., at an end thereof), such that the plug-in connector 206–208 attached to each terminal 152–154 extends on its cable 210–212 to any of the twelve receptacles in the respective receptacle array 200–202. The plug-in connectors 206–208 have shapes configured to insert into the receptacles of the receptacle arrays 200–202 so as to establish an electrical connection of such receptacles' terminals to the extra lift, lift and drop terminals 152–154, respectively. The receptacles of the arrays 200–202 into which the plug-in connectors 206–208 are inserted effectively determines which of the transformer taps are connected via the variable voltage array 150 through the bridge rectifiers (B1, B2 of FIG. 3) to the field winding terminals (F1, F2) during the extra lift mode 50, lift mode 52 and drop mode 54. The choice of receptacle in which the connectors 200–202 are inserted thus selects each of the extra lift voltage 60, lift voltage 62, and drop voltage 64 (FIG. 2).

The variable voltage array 150 provides the capability to variably set the field winding voltages created by the magnet generator controller 20 without use of heavy and bulky variable resistors. The variable voltage array 150 can be implemented using printed circuit board traces and standard receptacles and connectors mountable on a printed circuit board. The design of the variable voltage array thus enables fabrication of the magnet generator controller circuitry 100 on the printed circuit board 170.

With reference again to FIGS. 3 and 4, the function select switch 120 allows the illustrated magnet generator controller 20 (FIG. 1) to be set for normal run operation (as shown in FIG. 2), or for exclusive operation in any of the extra lift mode 50, the lift mode 52 or the drop mode 54 for an indefinite time. This is intended only for use during setup or configuration of the extra-lift voltage 60, the lift voltage 62 and the drop voltage 64 (all shown in FIG. 2) using the variable voltage array 150. During normal run operation, the magnet generator controller 20 cycles through the extra lift mode 50 and the auto-drop mode 54 for brief time intervals (i.e., set using the extra lift timer 132 (XLT) and auto-drop timer 130 (ADT) in FIG. 3). Using the function select switch, the magnet generator controller 20 can be set exclusively into one of the modes 50, 52, 54 to allow careful measurement and adjustment of the electromagnet voltages produced in these modes.

In the illustrated magnet generator controller 20, the function select switch 120 is fabricated as four receptacles 230–233, one for each of run operation, extra lift mode, lift mode and drop mode. Each receptacle has two pairs of terminals. A master function select plug-in connector 236 having a shape configured to mate in the receptacles 230–233 is inserted into a selected one of the receptacles to select its respective mode of operation. When inserted into a receptacle, the master function select connector 236 serves to jumper the receptacle's pairs of terminals, which effectively closes the switch contacts (which are denoted "run," "extra," "lift," and "drop" in FIG. 3 for the respective modes of operation). An LED 240–243 is associated with each receptacle to indicate the selected mode of operation. The LEDs 240–243 light when the magnet generator controller 20 is operated with the master function select connector 236 is inserted into its associated receptacle 230–233. When the master function select switch is in the run position, the LEDs 240–243 further light to indicate the magnet generator controller's current phase or stage of operation.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A system for controlling power to an electromagnet, comprising:
   a transformer having a plurality of taps off of a transformer winding;
   a formation of receptacles, each receptacle having a set of terminals connected to a subset of the taps, where the subsets of the taps connected to the receptacles' terminals provide a sequence of discrete voltages at the receptacles according to an order of the receptacles in the formation;
   an electromagnet control circuit having an input section and operating to control the power in the electromagnet according to a voltage applied at the input section in a mode of operation; and
   a connector for inserting into any one of the receptacles and having a set of conductors for electrically connecting the input section with the set of terminals of the receptacle into which the connector is inserted;
   whereby choosing the receptacle in which the connector is inserted selects the electromagnet power said mode of operation.

2. The system of claim 1 comprising separate formations of receptacles, input sections and connectors for each of a plurality of modes of operation, the respective connectors inserting into any one of the receptacles in the respective formations to electrically connect the respective input section with the set of terminals of said receptacles into which the respective connectors are inserted; whereby choosing the receptacles in which the respective connectors are inserted selects the electromagnet power in the respective modes of operation.

3. The system of claim 2 further comprising:
   a function select switch having a plurality of positions, a first position of the function select switch causing an operation in which the electromagnet control circuit sequences through the modes of operation in response to an operator input, and others of the positions of the function select switch causing the electromagnet control circuit to operate exclusively in a selected one of the modes of operation.

4. The system of claim 1 comprising separate formations of receptacles, input sections and connectors for each of an extra lift mode, a lift mode and a drop mode of operation, the respective connectors inserting into any one of the receptacles in the respective formations to electrically connect the respective input section with the set of terminals of said receptacles into which the respective connectors are inserted; whereby choosing the receptacles in which the respective connectors are inserted selects the electromagnet power in the respective modes of operation.

5. The system of claim 4 further comprising:
   a function select switch having a plurality of positions, a first position of the function select switch causing an operation in which the electromagnet control circuit sequences through the modes of operation in response to an operator input, a second position of the function select switch causing the electromagnet control circuit to operate exclusively in the extra lift mode, a third position of the function select switch causing the electromagnet control circuit to operate exclusively in the lift mode, and a fourth position of the function select switch causing the electromagnet control circuit to operate exclusively in the drop mode.

6. An electromagnet controller, comprising:
   a printed circuit board;
   circuitry supported on the printed circuit board having a generating section for producing an electromagnet control voltage to control the power in an electromagnet;
   a transformer having a plurality of taps off of a transformer winding;
   a plurality of receptacles mounted on the printed circuit board and ordered in a formation, the receptacles each having a pair of terminals;
   traces on the printed circuit board interconnecting the pairs of terminals in the receptacles to pairs of the transformer's taps; and
   a connector of a shape to plug into any one of the receptacles and having conductors for establishing an electrical connection of the terminals of the receptacle into which the connector is plugged within the generating section, the electrical connection determining the electromagnet control voltage in at least one mode of operation of the electromagnet controller;
   whereby a choice of the receptacle into which the connector is plugged selects the electromagnet control voltage in the at least one mode of operation.

7. The electromagnet controller of claim 6 further comprising:
   an electrical equipment panel for supporting components of the electromagnet controller; and
   vibration isolating fasteners for mounting the printed circuit board to the electrical equipment panel.

8. A system for operating an electromagnet, comprising:
   an electromagnet;
   a DC generator having a field winding and being connected to generate power in the electromagnet;
   an operator control device;
   a magnet generator controller fabricated on a printed circuit board and operating to vary a field voltage on the field winding to control the power in the electromagnet in response to the operator control device; and
   a variable voltage selection array having an array of receptacles supported on the printed circuit board and a connector, the receptacles associated one-to-one with a plurality of voltage values, the connector being insertable into any of plural receptacles of the array to select the field voltage in an operating mode of the magnet generator controller from the voltage values.

9. The system of claim 8 further comprising:

a source of alternating current power;

a transformer powered by the source and having a plurality of taps from a winding;

an arrangement of conductors for interconnecting the receptacles to various pairs of the taps; and a rectifier connectable by inserting the connector into different of the receptacles to different pairs of the taps, such that insertion of the connector into different of the receptacles selects from different alternating current voltages, the rectifier operating to rectify the selected alternating current voltage in the operating mode to produce the field voltage.

10. A method of setting an electromagnet voltage in a magnet generator controller, comprising:

producing alternating current power;

applying the alternating current power to a transformer having a plurality of winding taps to produce a variety of alternating current voltages at pairs of the winding taps;

carrying the alternating current voltages to a plurality of receptacles arranged in an array and interconnected one-to-one with the pairs of winding taps;

connecting a plug having a connection to a rectifier input into a selected one of the receptacles to select from the alternating current voltages for input to the rectifier;

rectifying the selected alternating current voltage in the rectifier; and applying the rectified, selected alternating current voltage to a field winding of a generator to control the power in an electromagnet connected to the generator.

11. A controller for controlling power applied by a generator to an electromagnet, comprising:

a field voltage generator circuit having a plurality of switch contactors for selectively applying a plurality of operator-settable voltages at a pair of terminals connectable to a field winding of the generator;

a controller operating circuit having a function select switch, an operator control switch, a plurality of relay switches coupled with the switch contactors, and at least one timer;

the controller operating circuit selectively activates the relay switches in response to the function select switch, the operator control switch, and the at least one timer to cause the field voltage generator circuit to select from the operator settable voltages to apply at the terminals;

the function select switch being operator-settable to select from a plurality of functions of the controller operating circuit, the functions comprising a run function and a plurality of exclusive mode functions;

the controller operating circuit operating according to the run function to sequence through a plurality of modes in response to the operator control switch and the at least one timer, each of the modes associated with one of the operator-settable voltages, the controller operating circuit selectively activating the relay switches in each mode to cause the field voltage generator circuit to apply the operator-settable voltage associated with such mode;

the controller operating circuit operating according to the exclusive mode functions to remain exclusively in respective ones of the modes, where the controller operating circuit selectively activates the relay switches to cause the field voltage generator to apply the operator-settable voltage associated with the respective mode.

12. The controller of claim 11 further comprising a variable voltage selector for setting each of a lift voltage and a drop voltage by the operator for a lift mode and a drop mode, respectively.

13. The controller of claim 12 wherein the variable voltage selector further being for setting an extra lift voltage for an extra lift mode.

\* \* \* \* \*

UNITED STATES PATENT AND TRADEMARK OFFICE
CERTIFICATE OF CORRECTION

PATENT NO.    : 5,905,624

DATED         : May 18, 1999

INVENTOR(S)   : Andreica et al.

It is certified that error appears in the above-identified patent and that said Letters Patent is hereby corrected as shown below:

| Col./Line | Error Reads | Should Read |
|---|---|---|
| 7/44 | said mode | in said mode |

Signed and Sealed this

Fourteenth Day of December, 1999

Attest:

Q. TODD DICKINSON

Attesting Officer

Acting Commissioner of Patents and Trademarks